(12) United States Patent
Ravindran et al.

(10) Patent No.: US 10,425,323 B2
(45) Date of Patent: Sep. 24, 2019

(54) DISTRIBUTED PRODUCER MOBILITY MANAGEMENT IN INFORMATION CENTRIC NETWORKING

(71) Applicant: Futurewei Technologies, Inc., Plano, TX (US)

(72) Inventors: Ravishankar Ravindran, San Ramon, CA (US); Asit Chakraborti, Pleasanton, CA (US); Aytac Azgin, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 250 days.

(21) Appl. No.: 15/493,444

(22) Filed: Apr. 21, 2017

(65) Prior Publication Data

US 2018/0198700 A1    Jul. 12, 2018

Related U.S. Application Data

(60) Provisional application No. 62/443,478, filed on Jan. 6, 2017.

(51) Int. Cl.
*H04L 12/751*    (2013.01)
*H04L 29/12*    (2006.01)

(52) U.S. Cl.
CPC .......... *H04L 45/02* (2013.01); *H04L 61/3015* (2013.01); *H04L 61/1582* (2013.01)

(58) Field of Classification Search
CPC .. H04L 45/02; H04L 61/1582; H04L 61/3015
See application file for complete search history.

(56) References Cited

U.S. PATENT DOCUMENTS

| | | | |
|---|---|---|---|
| 2012/0297088 A1* | 11/2012 | Wang | H04L 63/0272 709/238 |
| 2016/0182353 A1* | 6/2016 | Garcia-Luna-Aceves | H04L 45/306 709/241 |
| 2017/0230290 A1* | 8/2017 | Li | H04L 41/12 |

* cited by examiner

*Primary Examiner* — Asad M Nawaz
*Assistant Examiner* — Saad A. Waqas
(74) *Attorney, Agent, or Firm* — Futurewei Technologies, Inc.

(57) ABSTRACT

The disclosure includes a method for an Information-Centric Networking (ICN) network. According to the method, a PoA receives registration information from a producer, where the registration information comprises a name prefix of the producer. The PoA sends a plurality of Border Gateway Protocol (BGP) messages to a plurality of peers of the PoA, wherein at least some of the BGP messages respectively comprise a first mapping between the name prefix of the producer and an identifier of the PoA. By sending the BGP messages comprising the mapping to the plurality of peers, the PoA may efficiently make the plurality of peers to locate the producer.

8 Claims, 5 Drawing Sheets

DISTRIBUTED PRODUCER MOBILITY MANAGEMENT IN INFORMATION CENTRIC NETWORKING

CROSS-REFERENCE TO RELATED APPLICATIONS

The present application claims priority to U.S. Provisional Patent Application No. 62/443,478, filed Jan. 6, 2017, by Ravishankar Ravindran and titled "Information Management In Information-Centric Networking," which is incorporated by reference herein in its entirety.

BACKGROUND

Information-Centric Networking (ICN) is an approach growing rapidly. In an ICN network, an important feature is that the Internet infrastructure is based on "named information," rather than being based on end hosts. In contrast, the TCP/IP network may be understood as a Host-Centric Networking structure. ICN uses names of information (content) to identify the information (content) rather than using IP addresses to identifying the information. Because IP addresses refer to locations, avoiding the usage of IP addresses means that the information becomes independent from location. When a consumer requests some information from the ICN network, the consumer may send a request for the information, where the request carries the name information, such as name prefix, of the information. The request doesn't have to carry the IP address of the information as the target address of the request.

SUMMARY

According to one aspect of the present disclosure, there is provided a method for an Information-Centric Networking (ICN) network. According to the method, a Point of Attachment (PoA) receives registration information from a producer, where the registration information comprises a name prefix of the producer. Furthermore, the PoA sends a plurality of messages to a plurality of peers of the PoA, wherein at least some of the messages respectively comprise a first mapping between the name prefix of the producer and an identifier of the PoA. Based on this method, a PoA may send the mapping to its peers without highly depending on a centralized device, such as a server, in the network.

Optionally, in any preceding aspect, another implementation of the aspect provides that the PoA receives an interest for content available from the producer from a first peer of the plurality of peers of the PoA after the PoA sends the first mapping to the first peer. Furthermore, the PoA receives a message comprising a second mapping between the name prefix of the producer and an identifier of a second peer of the plurality of peers from the second peer. Moreover, the PoA sends a message comprising the second mapping to the first peer.

Optionally, in any preceding aspect, a further implementation of the aspect provides that the PoA notifies the second peer to avoid sending a message including the second mapping to the first peer.

Optionally, in any preceding aspect, a further implementation of the aspect provides that the PoA sends a message comprising the first mapping to a controller, where the PoA, the plurality of peers and the controller are in a same domain.

Optionally, in any preceding aspect, a further implementation of the aspect provides that the PoA, the first peer and the second peer are border routers of a domain.

Optionally, in any preceding aspect, a further implementation of the aspect provides that the plurality of messages includes a plurality of Border Gateway Protocol (BGP) messages.

According to one aspect of the present disclosure, there is provided a method for controlling data communication in a network. According to the method, a Point of Attachment (PoA) receives an interest for content available from a producer registered to the PoA from a first peer of the PoA, where the interest includes a name prefix of the producer. The PoA further receives a message indicating that the producer is registered to a second peer of the PoA. Moreover, the PoA sends a mapping between the name prefix of the producer and an identifier of the second peer to the first peer. Based on this method, the PoA may inform a peer to which a consumer is registered that the producer has moved to another peer, so that requests from the consumer may be routed to the other peer by the peer to which the consumer is registered. Consequently, the consumer may continue requesting the content available from the producer even if the producer roams from the PoA to the other peer.

Optionally, in any preceding aspect, a further implementation of the aspect provides that the PoA notifies the second peer to avoid sending the mapping to the first peer.

Optionally, in any preceding aspect, a further implementation of the aspect provides that the PoA sends the mapping to a controller, where the PoA, the first peer, the second peer and the controller are in a same domain.

Optionally, in any preceding aspect, a further implementation of the aspect provides that the message indicating that the producer is registered to a second peer is a Border Gateway Protocol (BGP) message.

According to one aspect of the present disclosure, there is provided a Point of Attachment (PoA). The PoA includes a non-transitory memory comprising instructions, and one or more processors in communications with the memory. The one or more processors are configured to execute the instructions to: receive registration information from a producer, where the registration information comprises a name prefix of the producer; and send a plurality of messages to a plurality of peers of the PoA, where at least some of the messages respectively comprise a first mapping between the name prefix of the producer and an identifier of the PoA. The PoA may send the mapping to its peers without highly depending on a centralized device, such as a server, in the network.

Optionally, in any preceding aspect, a further implementation of the aspect provides that the one or more processors are configured to execute the instructions to: receive an interest for content of the producer from a first peer of the plurality of peers after the PoA sends the first mapping to the first peer; receive a message comprising a second mapping between the name prefix of the producer and an identifier of a second peer of the plurality of peers from the second peer; and send a message comprising the second mapping to the first peer.

Optionally, in any preceding aspect, a further implementation of the aspect provides that the one or more processors are configured to execute the instructions to notify the second peer to avoid sending a message comprising the second mapping to the first peer.

Optionally, in any preceding aspect, a further implementation of the aspect provides that the one or more processors are configured to execute the instructions to send a message comprising the first mapping to a controller, wherein the PoA, the plurality of peers and the controller are in a same domain.

Optionally, in any preceding aspect, a further implementation of the aspect provides that the PoA, the first peer and the second peer are border routers of a domain.

Optionally, in any preceding aspect, a further implementation of the aspect provides that the plurality of messages includes a plurality of Border Gateway Protocol (BGP) messages.

According to one aspect of the present disclosure, there is provided a Point of Attachment (PoA). The PoA includes a non-transitory memory comprising instructions, and one or more processors in communications with the memory. The one or more processors are configured to execute the instructions to: receive an interest for content available from a producer registered to the PoA from a first peer of the PoA, where the interest include a name prefix of the producer; receive a message indicating that the producer is registered to a second peer of the PoA; and send a mapping between the name prefix of the producer and an identifier of the second peer to the first peer. The PoA may inform a peer to which a consumer is registered that the producer has moved to another peer, so that requests from the consumer may be routed to the other peer by the peer to which the consumer is registered. Consequently, the consumer may continue requesting the content available from the producer even if the producer roams from the PoA to the other peer.

Optionally, in any preceding aspect, a further implementation of the aspect provides that the one or more processors are configured to execute the instructions to notify the second peer to avoid sending the mapping to the first peer.

Optionally, in any preceding aspect, a further implementation of the aspect provides that the one or more processors are configured to execute the instructions to send the mapping to a controller, wherein the PoA, the first peer, the second peer and the controller are in a same domain.

Optionally, in any preceding aspect, a further implementation of the aspect provides that the message indicating that the producer is registered to a second peer of the PoA is a Border Gateway Protocol (BGP) message.

Optionally, in any preceding aspect, a further implementation of the aspect provides that the interest includes an identifier of the first peer of the PoA, wherein the processors are further configured to execute the instructions to: receive the interest for content via a port of the PoA; and store a mapping between the identifier of the first peer and the port receiving the interest.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
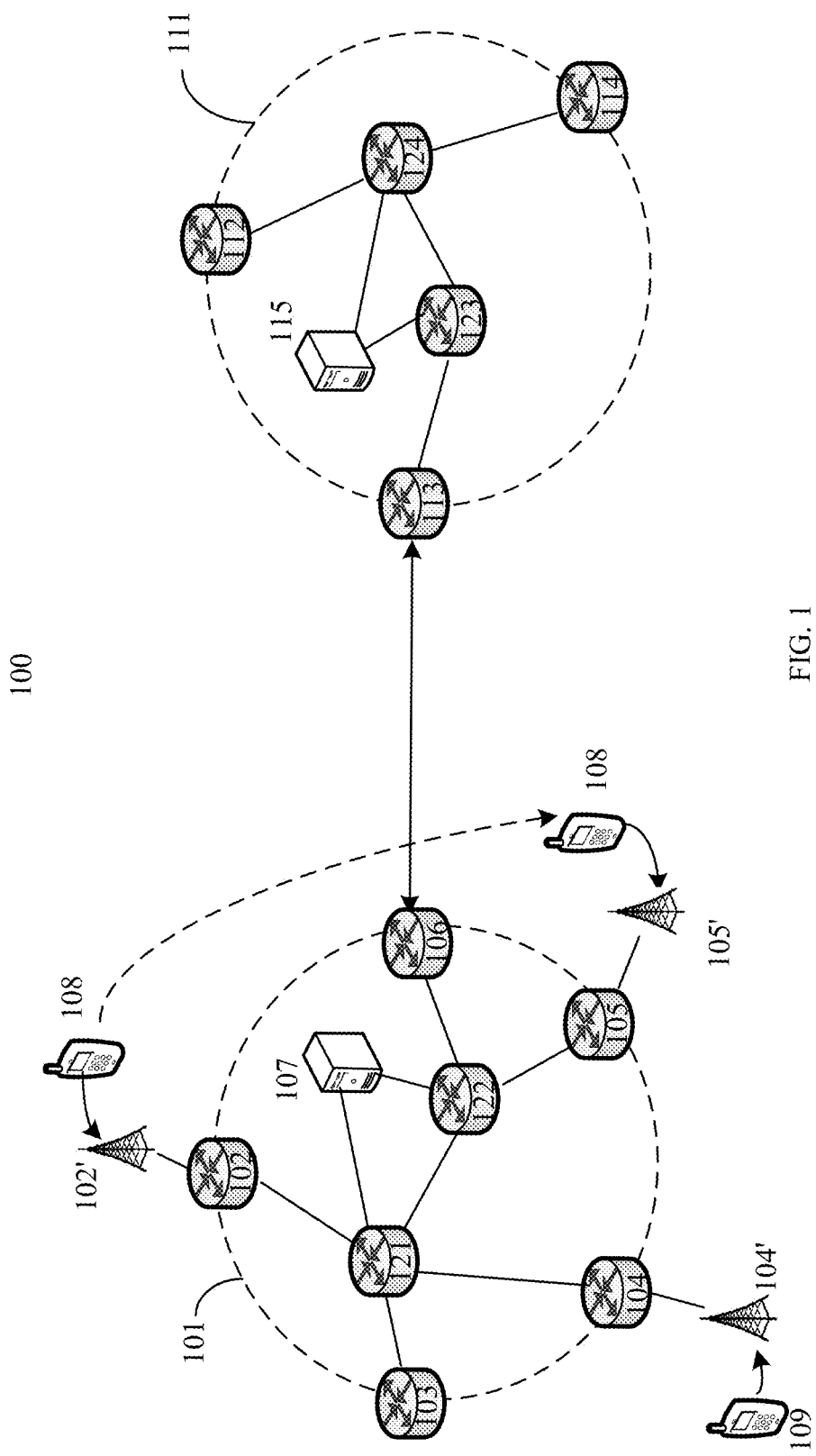
FIG. 1 illustrates is a schematic diagram of a network system 100 according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

In some embodiments, an Information-Centric Networking (ICN) network may include ICN service routers and normal ICN routers. The ICN service routers may work as Points of Attachment (PoAs) of the ICN network. In some embodiments, via a PoA, a mobile device may attach itself to an ICN network based on registration, so that the mobile device may share data in the ICN network and receive data from the ICN network. In some embodiments, the PoA is the point of attachment in Request for Comments (RFC) 7927. RFC 7927 is here incorporated by reference into this specification by its entirety. The ICN service routers may be the border routers of the ICN network. In some embodiments, a PoA may receive registration information from a producer, where the registration information includes a name prefix of the producer. The producer may produce content (e.g., images, videos, music, web pages, and so on) and want to share the content to consumers via the ICN network. In some embodiments, the name prefix of the producer may be the name prefix of the content produced by the producer. In some embodiments, the name prefix may be an identifier of the producer or the content produced by the producer. The identifier may be different from any other identifier. The registration information is sent by the producer to register the producer to the PoA. After the producer is successfully registered to the PoA, it may mean that the producer may communicate with consumers registered to the ICN network via the PoA. After receiving the registration information, the PoA may send a plurality of messages to a plurality of peers of the PoA, where at least some of the messages respectively comprise a first mapping between the name prefix of the producer and an identifier of the PoA. The peers of the PoA are PoAs in the ICN network. After a peer receives the mapping between the name prefix of the producer and an identifier of the PoA and the peer receives an interest (e.g., a message indicating an interest) for content identified by the name prefix of the producer from a consumer, the peer may determine that the interest needs to be sent to the PoA so that the interest may be sent to the producer.

In some embodiments, the PoA may receive an interest for content available from a producer from a first peer of the PoA and receive a message indicating that the producer is registered to a second peer of the PoA. In such a situation, the PoA may send a mapping between the name prefix of the producer and the identifier of the second peer to the first peer, so that the first peer may know that the producer has moved to the second peer. If the first peer receives another interest for the content available from the producer, the first peer may send the interest to the second peer rather than the PoA.

In some embodiments, content available from a producer may refer to content produced by the producer itself or content produced by another device but shared by the producer.

FIG. 1 is a schematic diagram of a network system 100 according to an embodiment of the disclosure. Network system 100 may be an Information-Centric Networking (ICN) network and include domain 101 and domain 111, for example.

Each domain may include a plurality routers and at least one domain controller. In some embodiments, a domain controller in a domain may include a mapping database. In some embodiments, when a mobile device belonging to a first domain roams to a second domain, the domain controller in the first domain may track of the resources of the mobile device. The resources of the mobile device may be referred to as named entities. A named entity may be named content, a named application, a named service or a name host.

Domain 101 further includes ICN service routers and normal ICN routers. The ICN service routers include router 102, router 103, router 104, router 105 and router 106. The normal ICN routers include router 121 and router 122. In some embodiments, domain 101 may have more routers. In some embodiments, ICN service routers 102-106 are all border routers of domain 101. In some embodiments, the border routers of a domain may communicate with another domain without via any router in the domain. For example, as illustrated in FIG. 1, border router 106 may communicate with domain 111 without via any other router in domain 101. In some embodiments, border router 105 may communicate with another domain which is not illustrated in FIG. 1 without via any other router in domain 101. In some embodiments, an ICN service router may have the function of a Point of Attachment (PoA). Therefore, the ICN service router may also be called as a PoA. For example, ICN service routers 102-106 may be called as PoAs 102-106. Each PoA may be coupled with an access point. For example, PoA 102 is coupled with access point 102', PoA 104 is coupled with access point 104' and PoA 105 is coupled with access point 105'. In some embodiments, an access point may be a base station. In such a scenario, a mobile device may get itself registered to a PoA (ICN service router) via an access point. The mobile device may further leave the PoA and register itself to another PoA. Normal ICN routers may refer to routers used to route information between different ICN service routers in a domain. For example, normal ICN routers 121 and 122 are used to route information between ICN service routers 102-106. In contrast, ICN service routers, being border routers, may be used to send packets of one domain to one or more other domains and receive packets from the other domains. For example, router 106 in domain 101 may send packets from domain 101 to router 113 in domain 111, and receive packets sent by router 113 in domain 111. In some embodiments, all routers in a domain may be coupled with each other. In some embodiments, all border routers in a domain may communicate with each other based on Internal Border Gate Protocol (IBGP), while border routers of different domains may communicate with each other based on External Border Gate Protocol (EBGP). (Other suitable communication protocols are possible.) For example, router (PoA) 102 and router (PoA) 106 may be border routers of domain 101. These two routers therefore may communicate with each other based on IBGP. In another example, router 106 and router 113 may be routers of different domains. These two routers therefore may communicate with each other based on EBGP.

In some embodiments, each of the PoAs (ICN service routers) in system 100 may have a Forwarding Label Cache Table (FLT). For example, each of routers 102, 103, 104, 105, 106, 112, 113 and 114 has its own FLT. Each of normal ICN routers, such routers 121, 122, 123 and 124 may not have a FLT. All the routers respectively may have a Forwarding Information Base (FIB).

In some embodiments, each domain may have a domain controller. For example, the domain controller of domain 101 is controller 107 and the domain controller of domain 111 may be controller 115. In some embodiments, the domain controller of a domain may be a part of the domain or a device independent from or outside the domain.

In some embodiments, FIG. 1 further includes producer 108 and consumer 109 attached to network 100. Producer 108 and consumer 109 may be mobile terminals, such as smart phones, lap-tops, mobile storage devices or personal digital assistants (PDAs). For example, producer 108 may be a smart phone and consumer 109 may be a lap-top. In some embodiments, producer 108 may provide content to consumer 109. In some embodiments, producer 108 may also be considered as a consumer because producer 108 may also request content from another producer. In some embodiments, consumer 109 may also be considered as a producer because consumer 109 may also provide content to another consumer. In some embodiments, domain controller 115 of domain 111 is the home controller of producer 108, the content available from producer 108 or service available from producer 108. Because producer 108 is currently registered to domain 101, domain controller 107 of domain 101 is the local controller of producer 108, the service available from producer 108, or the content available from producer 108.

In an example where a mobile device, such as mobile phone, is subscribed to or owned by AT&T, a domain controller of the domain of AT&T is the home controller of the mobile device. When the mobile device leaves the domain of AT&T and comes into the domain of Verizon, for example, a domain controller of the domain of Verizon is the local controller of the mobile device and the domain controller of the domain of AT&T is still the home controller of the mobile device.

The article "A Survey of Information-Centric Networking," by Bengt Ahlgren, Christian Dannewitz, Claudio Imbrenda, Dirk Kutscher, and Borjie Ohlman, published in IEEE Communications Magazine on July 2012, is here incorporated by reference into this specification in its entirety.

Figure 2:
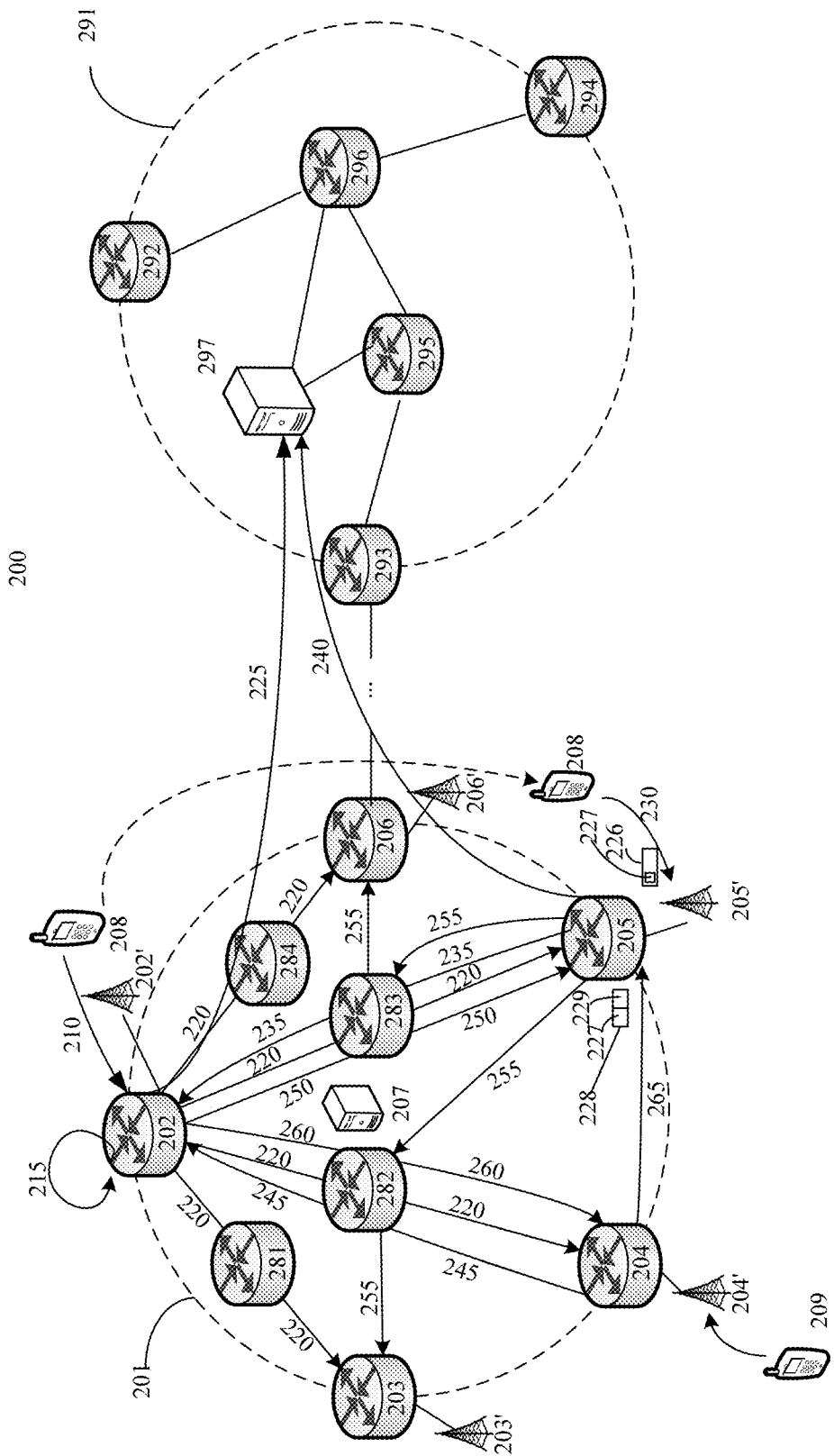
FIG. 2 is a schematic diagram of a network system 200 according to an embodiment of the disclosure.

FIG. 2 is a schematic diagram of a network system 200 according to an embodiment of the disclosure. Network system 200 may be an Information-Centric Networking (ICN) network and have a domain 201 and domain 291, each of which has a plurality of ICN service routers and normal ICN routers. The ICN service routers in domain 201 may include router 202, router 203, router 204, router 205 and router 206. The ICN service router in domain 291 may include router 292, router 293 and router 294. The normal ICN routers in domain 201 may include router 281, router 282, router 283 and router 284. The normal ICN routers in domain 291 may include router 295 and router 296. In some embodiments, an ICN service router may have the function of a PoA, via which a mobile device may get registered to a network. Therefore, the ICN service router may be called as a PoA. Normal ICN routers may refer to routers used to relay information between different ICN service routers. Domain 201 may have a domain controller 207 and domain 291 may have a domain controller 297. A plurality of producers and consumers, such as producer 208 and consumer 209, are coupled with network system 200. In some embodiments, a producer, such as producer 208, of some content, such as content A, may be a consumer of some other content, such as content B. The consumer, such as consumer 209, of the some content, such as content C, may be a producer of some other content, such as content D. Moreover, network system 200 may include access points 202', 203', 204', 205' and 206' which are respectively coupled with PoAs 202-206.

In some embodiments, producer 208 and consumer 209 are attached to domain 201 and domain controller 207 of domain 207 is the local controller of producer 208 and consumer 209, while domain 291 is the home domain of producer 208 and domain controller 297 of domain 291 is the home controller of producer 208.

In some embodiments, an access point may be a device having an antenna, receiving and transmitting signals based on WiFi, Global System for Mobile communication (GSM), Code Division Multiple Access (CDMA), Wideband Code Division Multiple Access (WCDMA), CDMA 2000, or long term evolution (LTE).

In some embodiments, domain 201 in FIG. 2 is domain 101 in FIG. 1. Routers 202-206 in FIG. 2 may respectively be routers 102-106 in FIG. 1; domain controller 207 in FIG. 2 may be domain controller 107 in FIG. 1; producer 208 in FIG. 2 may be producer 108 in FIG. 1; and consumer 209 in FIG. 2 may be consumer 109 in FIG. 1.

The following operations may be performed by devices in network 200 to help a consumer request content from producer.

At operation 210, a producer 208 may send the name prefix of producer 208 to router 202 in domain 201. In some embodiments, the name prefix may be sent to router 202 via access point 202'; in some other embodiments, the name prefix may be sent to router 202 without via access point 202'. In some embodiments, PoA 202 may be an ICN service router, which is a border router, of domain 201. In some embodiments, access point 202' may be an International Standards Organization (ISO) data link layer (layer 2) device without the ability of running Border Gateway Protocol (BGP) and PoA 202 may be an ISO network layer (layer 3) device running BGP.

In some embodiments, the name prefix of a producer may be any name prefix identifying the producer, or identifying a service or content of the producer. In an example, producer 208 may send "/producer" to PoA 202, where "/producer" is the name prefix of producer 208. In another example, producer 208 may send "/producer/X" to PoA 202, where "/producer/X" is a content prefix including name prefix "/producer." Because "/producer/X" starts with name prefix "/producer," registering the content prefix including the name prefix includes registering the name prefix.

In some embodiments, producer 208 is a mobile terminal, such as a smart phone, a lap-top, a mobile storage device or a personal digital assistant (PDA). Because the mobile terminal may produce or provide content to a consumer, the mobile terminal may be called a producer in some embodiments.

At operation 215, PoA 202 may generate a first mapping based on the received name prefix. The first mapping may be a mapping between the name prefix of producer 208 and an identifier of PoA 202 as shown in Entry 1 below. In some embodiments, the identifier of a PoA may be name prefix of the PoA.

| Entry 1 | |
|---|---|
| name prefix of producer 208 | identifier of PoA 202 |

After PoA 202 receives an interest (interest request) for content of producer 208, PoA 202 may send the interest to access point 202' so that the interest may be sent to producer 208 by access point 202'. The content of producer 208 may be content available from producer 208. In some embodiments, content available from a producer may refer to content produced by the producer itself or content produced by another device but shared by the producer.

At operation 220, PoA 202 may respectively send the first mapping to a plurality of routers in domain 201.

In some embodiments, the plurality of routers may be some or all border routers (ICN service routers) in the domain. In some embodiments, PoA 202 may respectively send the first mapping to PoAs 203-206. For example, PoA 202 may respectively send BGP messages carrying the first mapping to PoAs 203-206.

Consequently, PoAs receiving the first mapping may respectively store the first mapping as shown in entry 1 into the FLTs of the PoAs as a first FLT entry. For example, when PoAs 203-206 respectively receive the first mapping, PoAs 203-206 may respectively store the first mapping in the FLTs of PoAs 203-206 as a first FLT entry. In other words, each FLT in PoAs 203-206 has the first mapping.

Besides the first FLT entry, PoAs 203-206 may further respectively have a Forwarding Information Base (FIB) including an FIB entry. The FIB entry includes a mapping between the identifier of PoA 202 and an identifier of interface or port coupled with PoA 202 as shown in Entry 2 below, where the interface or port belongs to the PoA receiving the first mapping. In some embodiments, a port is equal to an interface.

| Entry 2 | |
|---|---|
| identifier of PoA 202 | identifier of interface or port coupled with PoA 202 |

For example, with respect to the FIB entry in PoA 203, the interface or port in entry 2 refers to an interface or port that belongs to PoA 203 and is coupled with PoA 202.

In some embodiments, each router in system 200 may have a FIB. Furthermore, only PoAs, such as PoAs 202-206, respectively have FLTs. Normal ICN routers, such as routers 281-284, have no FLTs.

When one of PoAs 203-206 receives an interest including a name prefix from a consumer, such as a mobile terminal, the PoA may determine the identifier of a PoA based on the name prefix in the interest by performing a longest prefix match in the FLT of the PoA. For example, if the name prefix in the interest is the name prefix of producer 208 and the FLT includes the first mapping, the PoA may determine the identifier of PoA 202 based on the received interest and the first mapping in the FLT. The interest may refer to an interest request message. Furthermore, the PoA may determine an interface or port based on the identifier of PoA 202 and an FIB entry in the PoA, where the FIB entry includes the identifier of PoA 202 and the interface or port. The determined interface or port belongs to the PoA and couples the PoA with PoA 202. Therefore, the PoA may send the interest to PoA 202 via the determined interface or port so that the interest may arrive at producer 208.

In some embodiments, the interest sent by the PoA may further include the identifier of the PoA, so that producer 208 or PoA 202 may send content requested by the interest to the PoA based on the identifier of the PoA. Furthermore, if PoA 202 receives the interest via a port of PoA 202, PoA 202 may store a mapping between the port and the identifier of the PoA sending the interest. When PoA 202 needs to send requested content to the PoA sending the interest, PoA 202 may determine the port based on the mapping and then send the requested contented via the determined port to the PoA sending the interest. In some embodiments, the identifier of the PoA is added into the interest by the PoA. In some embodiments, the identifier of the PoA is added into the interest by the consumer.

At operation 225, PoA 202 may send an inter-domain message to domain controller 297 in domain 291. The inter-domain message is used to inform domain 291 that producer 208 is registered to domain 201. Consequently, when a consumer in domain 291 has an interest for content available from producer 208, the interest will be sent to domain 201.

At operation 230, PoA 205 may receive the name prefix of producer 208 sent by producer 208 and generate a second mapping, where the second mapping is between the name prefix of producer 208 and the identifier of PoA 205. The name prefix of producer 208 may be sent to PoA 205 in a registration request from producer 208 after producer 208 leaves PoA 202 and arrives at PoA 205. Furthermore, based on the received name prefix of producer 208, PoA 205 stores a second mapping in the FLT of PoA 205 as a second FLT entry as shown in Entry 3 below. In some embodiments, the identifier of PoA 205 may refer to a name prefix of PoA 205. In some embodiments, the name prefix of a PoA may be the name of the PoA.

| Entry 3 | |
| --- | --- |
| Name prefix of producer 208 | Identifier of PoA 205 |

Sending the name prefix of producer 208 may be caused by the movement of producer 208 from PoA 202 to PoA 205. As illustrated in FIG. 2, producer 208 may send a registration request 226 to PoA 205 at operation 230, where the registration request 226 may include the name prefix 227 of producer 208. The registration request 226 is used by producer 208 to register producer 208 to PoA 205.

Consequently, based on name prefix 227 of producer 208, PoA 205 may generate mapping 228 and store mapping 228 in the FLT of PoA 205 as the second FLT entry. Mapping 228 may be between name prefix 227 of producer 208 and identifier 229 of PoA 205. Furthermore, PoA 205 may further make the first FLT entry to be inactive by deleting the first FLT entry or setting the first FLT entry as stale. In some embodiments, the first mapping or the first FLT entry may be called as an old FLT entry and the second mapping or the second FLT entry may be called as the new FLT entry. The state that the old FLT entry is inactive and the new FLT entry is stored in the FLT as an active FLT entry is referred to as newly updated state. Comparing with the newly updated state, the state that old FLT entry is active (not deleted or not stale) and the new FLT entry is not store in the FLT is referred to as previous state.

Based on the name prefix of producer 208 received at operation 230, PoA 205 may further generate an FIB entry including the mapping between the name prefix of producer 208 and an identifier of an interface or port coupled with producer 208, where the interface or port is of PoA 205. The FIB entry is shown in Entry 4 below.

| Entry 4 | |
| --- | --- |
| Name prefix of producer 208 | Identifier of interface or port coupled with producer 208 |

Based on the generated FIB entry, PoA 205 may send an interest including the name prefix of producer 208 to producer 208 via the interface or port by the identifier in the FIB entry.

At operation 235, PoA 205 may send the second mapping to PoA 202.

Based on communication between PoA 202 and PoA 205, PoA 205 may get to know that producer 208 already left PoA 202. Therefore, PoA 205 may send the second mapping to PoA 202, so that PoA 202 may determine that producer 208 is registered to PoA 205 now.

At operation 240, PoA 205 may send a message to domain controller 297 of domain 291 to inform the domain 291 that producer 208 is registered to PoA 205.

At operation 245, PoA 202 receives an interest (interest request) for content of producer 208 from PoA 204. The interest is sent to PoA 202 because the interest is sent out before PoA 204 receives the second mapping. In some embodiments, the interest for content may be received by PoA 202 after producer 208 leaves PoA 202 and before PoA 204 receives the second mapping.

In some embodiments, the interest received by PoA 202 is originated by consumer 209 and is sent to PoA 204 via access point 204'. The interest may include a name prefix of producer 208. PoA 204 may determine the identifier of PoA 202 based on the name prefix of producer 208 and the first mapping, where the first mapping is a mapping between the name prefix of producer 208 and an identifier of PoA 202. Furthermore, based on the identifier of PoA 202 and an FIB entry including the mapping between the identifier of PoA 202 and an identifier of an interface or port coupling PoA 204 with PoA 202, PoA 204 determines the interface or port coupling PoA 204 with PoA 202. PoA 204 may add an identifier of PoA 204 in the interest and send, via the determined interface or port, the interest including the identifier of PoA 204 to PoA 202.

At operation 250, PoA 202 may send a policy message to PoA 205, where the policy message may indicate that the second mapping may be sent by PoA 205 to one or more PoAs other than PoA 204. In some embodiments, based on the identifier of PoA 204 in the received interest, PoA 202 may determine that the interest is from PoA 204. Therefore, PoA 202 may send the second mapping to PoA 204, rather than informing PoA 205 of sending the second mapping to PoA 204.

At operation 255, based on the policy message, PoA 205 may send the second mapping to one or more PoAs other than PoA 204. For example, after receiving the policy message, PoA 205 may send the second mapping to PoAs 203 and 206 without sending the second mapping to PoAs 204. In some embodiments, PoA 205 does not send the second mapping to PoA 202 after receiving the policy message, because the second mapping is already sent to PoA 202 at operation 235 before the policy message is received by PoA 205. However, in some embodiments, PoA 205 may send the second mapping to PoA 202. PoA 202 may discard the second mapping sent at operation 255. In some embodiments, sending a mapping to one or more PoAs other than the first PoA and a second PoA is a specific example of sending a mapping to one or more PoAs other than the first PoA.

At operation 260, PoA 202 may send the second mapping to PoA 204. PoA 204 may store the second mapping as the second FLT entry. Furthermore, PoA 204 may delete the first mapping.

At operation 265, based on the second FLT entry, PoA 204 may send an interest for content of producer 208 to PoA 205 to get the content. For example, based on the FLT entry and the name prefix of producer 208, PoA 204 may determine the identifier of PoA 205. Furthermore, PoA 204 has an FIB entry including a mapping between the identifier of PoA 205 and an interface or port coupled with PoA 205. Therefore, based on the determined identifier of PoA 205 and the FIB entry in the PoA 204, PoA 204 may determine the interface or port coupled with PoA 205. Consequently, when PoA 204 receives an interest from consumer 209, PoA 204 may add the identifier of PoA 204 in the interest and send the interest carrying the identifier of PoA 204 to PoA 205. The content of producer 208 may be the content produced by producer 208 or available from producer 208.

In some embodiments, each device in FIG. 1 and FIG. 2 may have a processor, a memory coupled to the processor, a transmit/receive (Tx/Rx) interface and ports. In some embodiments, the processor may refer to one or more processors and the memory may refer to one or more memories. The memory of each device may include one or more software modules. Each device may perform its actions as disclosed above according to the instructions stored in the one or more software modules in its memory. In some embodiments, the processor, memory, the Tx/Rx interface and ports may be hardware elements. The processor may refer to any electronic element having the ability to process data or signals. The memory may refer to any physical medium which may be powered by electricity and store data or signals.

Figure 3:
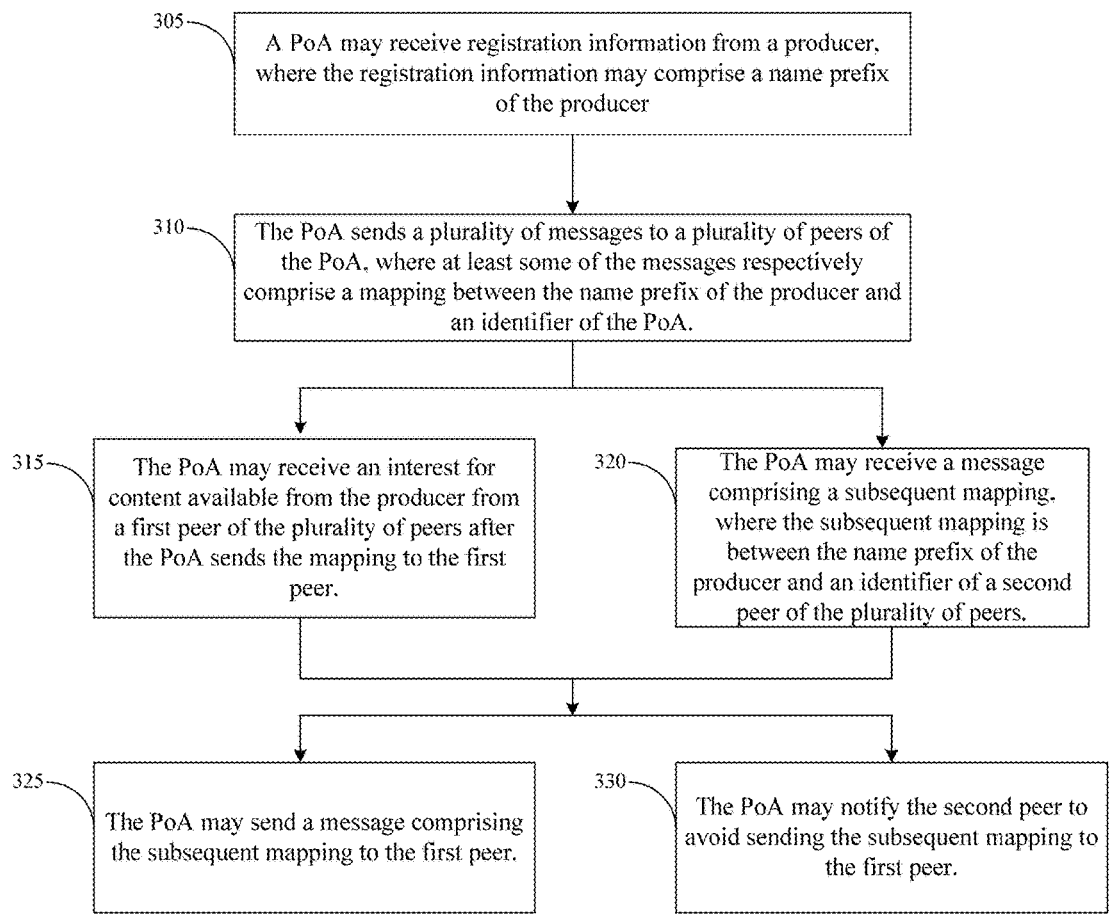
FIG. 3 is a flow chart of a method 300 according to an embodiment of the disclosure.

FIG. 3 is a flow chart of a method 300 in an ICN network according to an embodiment of the disclosure.

At operation 305, a PoA may receive registration information from a producer, where the registration information may comprise a name prefix of the producer.

In some embodiments, the PoA may be a PoA running BGP. For example, the PoA may be an ICN service router having the functions of a PoA. The PoA may be PoA 102 in FIG. 1 or PoA 202 in FIG. 2. The producer may be a smart phone, a lap-top, a mobile storage device, a phablet, or a personal digital assistant (PDA). For example, the producer may be producer 108 in FIG. 1 or producer 208 in FIG. 2. The registration information may be carried by one or more messages sent from the producer to the PoA. The PoA is capable of receiving, sending, generating and/or reading BGP messages.

At operation 310, the PoA sends a plurality of messages to a plurality of peers of the PoA, where at least some of the messages respectively comprise a mapping between the name prefix of the producer and an identifier of the PoA.

In some embodiments, the PoA may generate a mapping between the name prefix of the producer and the identifier of the PoA. In some embodiments, the identifier of the PoA may be the name prefix of the PoA. Furthermore, the PoA may send the mapping to the plurality of peers of the PoA. The mapping may be used by a peer of the PoA to forward or route an interest (interest request or request) for content available from the producer to the PoA. In some embodiments, the mapping may be generated by a device other than the PoA and may be sent to the PoA by the device other than the PoA. In some embodiments, the plurality of messages includes a plurality of BGP messages. For example, the BGP messages are BGP UPDATE messages defined or used by IETF. In some embodiments, the mapping is stored in a FLT. Therefore, the mapping may also be referred to as a mapping of FLT.

In some embodiments, the peers may be some PoAs, such as ICN service routers having the functions of a PoA in a domain. The PoA and the peers of the PoA may have one same role in the domain where they are located. For example, when the PoA is an IBGP border router in a domain of the ICN, the peers of the PoA may also be IBGP border routers in the domain of the ICN. For example, the PoA may be PoA 202 in FIG. 2 and the peers of the PoA may be PoAs 203-206 in FIG. 2.

In some embodiments, method 300 may end at operation 310. In some embodiments, method 300 may have more operations, such as operations 315-325 or operation 315-330.

At operation 315, the PoA may receive an interest for content available from the producer from a first peer of the plurality of peers after the PoA sends the mapping to the first peer.

After the PoA sends the mapping to the first peer, the first peer may store the mapping into an FLT as an FLT entry.

In some embodiments, the first peer may receive an interest for content available from the producer and the interest includes the name prefix of the producer. Based on the name prefix in the interest and the mapping, the first peer may determine the identifier of the PoA based on the mapping and consequently send the interest to the PoA based on the identifier of the PoA.

At operation 320, the PoA may receive a message comprising a subsequent mapping, where the subsequent mapping is between the name prefix of the producer and an identifier of a second peer of the plurality of peers.

In some embodiments, after the PoA receives the subsequent mapping, the PoA may find out that the mapping and the subsequent mapping have the same name prefix and different identifiers of PoAs. Therefore, the PoA may determine that the latest mapping of FLT, i.e. the subsequent mapping, is valid and the mapping is not valid anymore. The reception of the subsequent mapping may be caused by the roam or movement of the producer from the PoA to the second peer. The subsequent mapping may be referred to as the subsequent mapping of FLT. The message may be sent by the second peer.

In some embodiments, the mappings of FLT are sent via BGP messages. The BGP messages carrying the mappings of FLT only affect the FLT in a PoA and do not affect the FIB in the PoA. In some embodiments, the FIB in a PoA may be handled by intra-domain routing.

In some embodiments, operation 320 may be performed before or after operation 315. In some embodiments, operations 315 and 320 may be performed simultaneously.

At operation 325, the PoA may send a message comprising the subsequent mapping to the first peer.

Because the PoA may determine that the subsequent mapping is valid and the mapping is not valid anymore, the PoA may send the subsequent mapping to the first peer. Based on the subsequent mapping, the first peer may send an interest for content available from the producer to the second peer, so that the interest may be sent to the producer after the producer roams from the PoA to the second peer.

At operation 330, the PoA may notify the second peer to avoid sending the subsequent mapping to the first peer.

Because the PoA itself is responsible for sending the subsequent mapping to the first peer, the PoA may inform the second peer to avoid sending the subsequent mapping to the first peer. In some embodiments, informing the second peer to avoid sending the subsequent mapping to the first peer may refer to instructing the second peer to send the subsequent mapping to some or all peers of the second peer except the first peer, or except the first peer and the PoA.

In some embodiments, operation 330 is optional. In some embodiments, operation 330 may be performed before or after operation 325. In some embodiments, operations 325 and 330 may be performed simultaneously.

In some embodiments, after operation 305 and before operation 320, the PoA may send the mapping to a domain controller, such as controller 107 in domain 101 in FIG. 1 and controller 207 in domain 201 in FIG. 2, of the domain where the PoA is located. The domain controller may further send the mapping to another domain, such as domain 111 in FIG. 1, so that consumers coupled with the other domain may, based on the mapping, send an interest to the PoA. In some embodiments, the mapping may be sent to the other domain without via the domain controller of the domain.

In some embodiments, after operation 320, the PoA may send the subsequent mapping to the domain controller, such as controller 107 in FIG. 1 and controller 207 in FIG. 2, of the domain. The domain controller may further send the subsequent mapping to the other domain, such as domain 101 in FIG. 1, so that consumers coupled with the other domain may, based on the mapping, send an interest to the second peer, where the interest is for content available from the provider, such as provider 108 in FIG. 1 or provider 208 in FIG. 2. In some the subsequent mapping may be sent to the other domain without via the domain controller of the domain.

Figure 4:
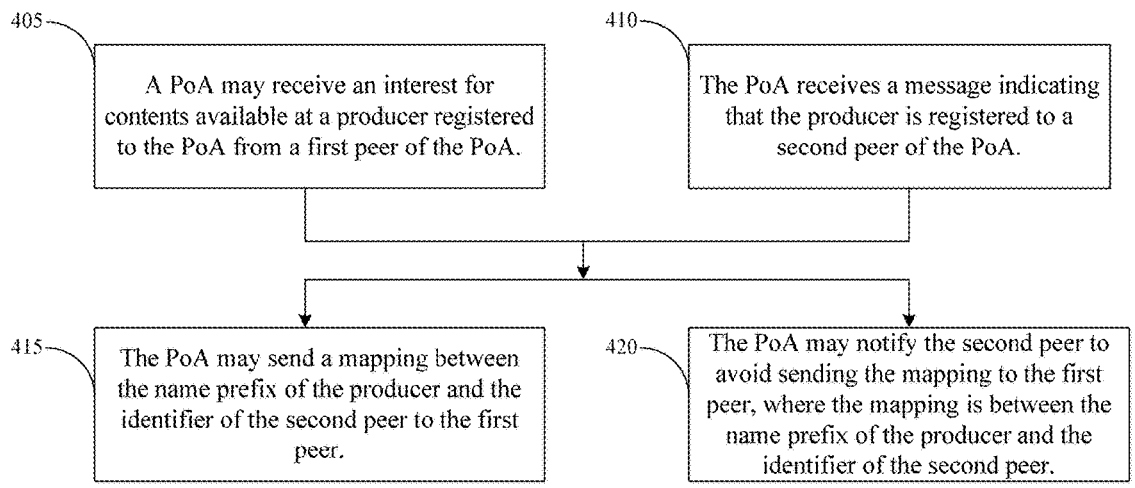
FIG. 4 is a flow chart of a method 400 according to an embodiment of the disclosure.

FIG. 4 is a flow chart of a method 400 in an ICN network according to an embodiment of the disclosure.

At operation 405, a PoA may receive an interest for content available from a producer registered to the PoA from a first peer of the PoA.

The PoA may be an ICN service device, such as device 102 in FIG. 1 or device 202 in FIG. 2. At the same time, the PoA may be a device runs BGP, such as a BGP border router. In some embodiments, the PoA, such as device 202, and any peer of the PoA, such as device 203, 204, 205 or 206, may play a same role in a domain. For example, if the PoA is a BGP border router, a peer of the BGP border router, such as the first peer or another peer, is also a BGP border router.

In some embodiments, a producer registers to a PoA where the registration may entail that the producer send the name prefix to the PoA via a registration request or another message, and also may entail that the PoA generate a mapping between the name prefix and the identifier of the PoA, and that the PoA store the mapping in its FLT as an FLT entry. In some embodiments, a producer registration with a PoA may include a negotiation on whether the producer may access the domain where the PoA is located or whether the producer may share content to the domain.

In some embodiments, the interest (interest request or request), may include the name prefix of the producer.

At operation 410, the PoA receives a message indicating that the producer is registered to a second peer of the PoA.

In some embodiments, the PoA may receive a message indicating that the producer is registered to the second peer of the PoA. For example, an option or a field of the message may be set to a particular value which represents that the producer is registered to the second peer, such as the PoA sending this message. Furthermore, the message may further include the identifier of the second peer. Based on the particular value and the identifier of the second peer, the PoA may determine that the producer left the PoA and is registered to the second peer of the PoA.

In some embodiments, the message received by the PoA at operation 410 may include a subsequent mapping between the name prefix of the producer and the identifier of the second peer. The subsequent mapping is used to indicate that the producer is registered to the second peer of the PoA.

At operation 415, the PoA may send a mapping between the name prefix of the producer and the identifier of the second peer to the first peer.

After the first peer receives the mapping sent at operation 415, the first peer may send an interest for content available from the producer to the second peer, rather than the PoA. In some embodiments, the second peer may consequently send the interest to the producer registered to the second peer. In some embodiments, if the second peer already stores some content available from the producer, the second peer may send the content stored in the second peer to the consumer requesting the content without or before sending the interest to the producer.

In some embodiments, when the PoA receives the subsequent mapping at operation 410, the mapping sent at operation 415 may be the same as the subsequent mapping received at operation 410. In some embodiments, when the PoA does not receive the subsequent mapping at operation 410, the mapping sent at operation 415 may be generated by the PoA itself.

At operation 420, the PoA may notify the second peer to avoid sending the mapping to the first peer, where the mapping is between the name prefix of the producer and the identifier of the second peer.

In some embodiments, the sequences of performing operations 405 and 410 are independent with each other. In some embodiments, operation 405 is performed earlier or later than operation 410. In some embodiments, the sequences of performing operations 415 and 420 are independent with each other. In some embodiments, operation 415 is performed earlier or later than operation 420.

In some embodiments, the PoA may further send the mapping between the name prefix of the producer and the identifier of the second peer to the domain controller of the domain where the PoA is located, so that the domain controller may send the mapping to another domain. In some embodiments, the PoA may send the mapping to another domain without via the domain controller of the domain where the PoA is located.

Figure 5:
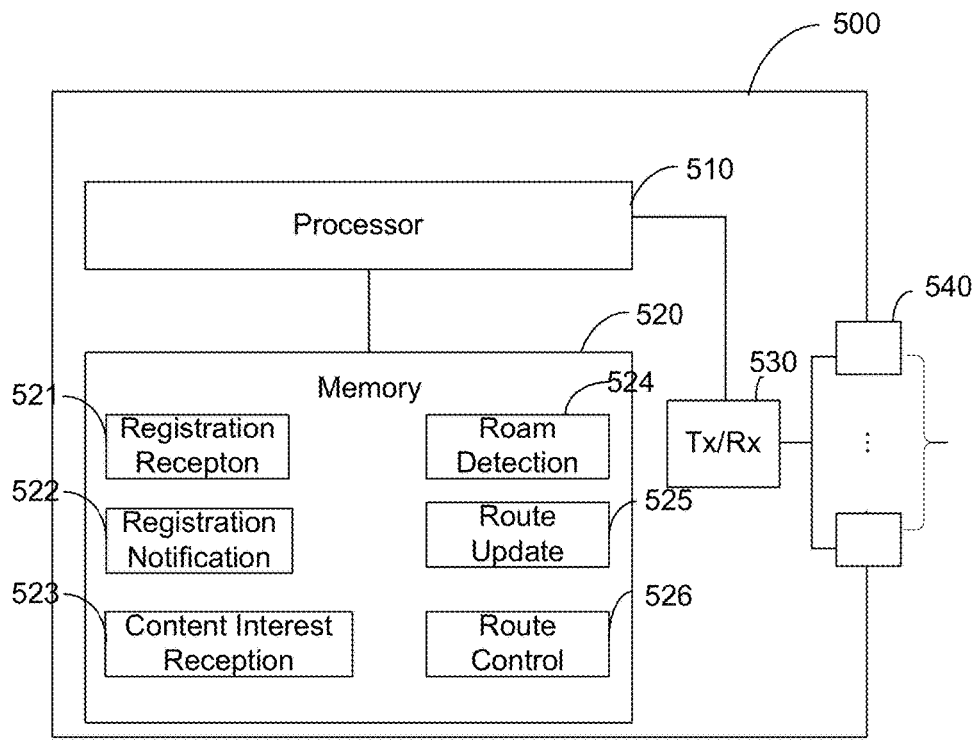
FIG. 5 is a schematic diagram of device 500 according to an embodiment of the disclosure.

FIG. 5 is a schematic diagram of device 500 according to an embodiment of the disclosure.

As shown in FIG. 5, device 500 may include a processor 510, a memory 520 coupled to processor 510, a transceivers (Tx/Rx) 530, and ports 540 coupled to Tx/Rx 530. Processor 510 may be implemented as a general processor or may be part of one or more application specific integrated circuits (ASICs) and/or digital signal processors (DSPs). Memory 520 may include a cache for temporarily storing content, e.g., a random-access memory (RAM). Additionally, memory 520 may include a long-term storage, e.g., a read-only memory (ROM). In one embodiment, memory 520 may include multiple software modules, such as registration reception module 521, registration notification module 522, content interest reception module 523, roam detection module 524, route update module 525 and route control module 526.

In some embodiments, when a software module performs an operation, actually it means that a processor directly or indirectly performs the operation according to the instructions in the software module.

In some embodiments, registration reception module 521 may perform all actions performed by the PoA at operation 305. For example, registration reception module 521 may receive registration information from a producer, where the registration information may comprise a name prefix of the producer.

In some embodiments, registration notification module 522 may perform all actions performed by the PoA at operation 310. For example, registration notification module 522 may send a plurality of messages to a plurality of peers of device 500, where at least some of the messages respectively comprise a mapping between the name prefix of the producer and an identifier of device 500.

In some embodiments, content interest reception module 523 may perform all actions performed by the PoA at operation 315. For example, content interest reception module 523 may receive an interest for content available from the producer from a first peer of the plurality of peers after device 500 sends the mapping the first peer.

In some embodiments, roam detection module 524 may perform all actions performed by the PoA at operation 320. For example, roam detection module 524 may receive a message comprising a subsequent mapping, where the subsequent mapping is between the name prefix of the producer and an identifier of a second peer of the plurality of peers.

In some embodiments, route update module 525 may perform all actions performed by the PoA at operation 325. For example, route update module 525 may send a message comprising the subsequent mapping to the first peer.

In some embodiments, route control module 526 may perform all actions performed by the PoA at operation 330. For example, route control module 526 may notify the second peer to avoid sending the subsequent mapping to the first peer.

In some embodiments, device 500 is PoA 102 in FIG. 1 or PoA 202 in FIG. 2. Memory 502 includes software instructing processor 501 to perform actions that PoA 102 or PoA 202 performs.

Figure 6:
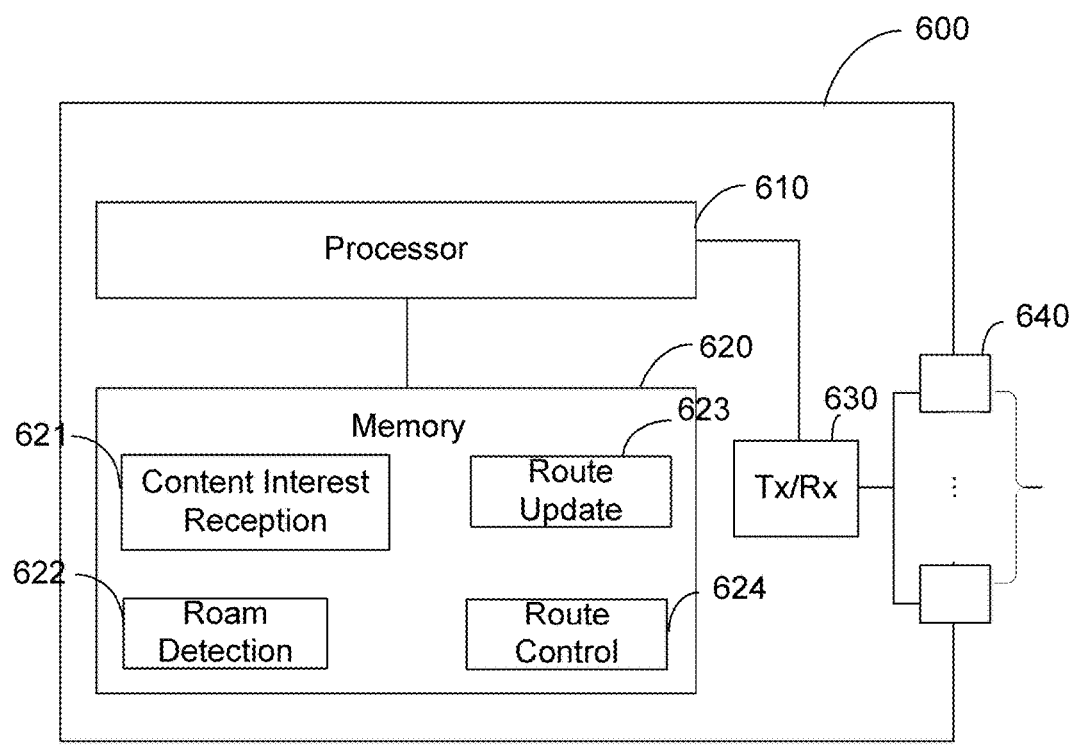
FIG. 6 is a schematic diagram of device 600 according to an embodiment of the disclosure.

FIG. 6 is a schematic diagram of device 600 according to an embodiment of the disclosure.

As shown in FIG. 6, device 600 may include a processor 610, a memory 620 coupled to processor 610, a transceivers (Tx/Rx) 630, and ports 640 coupled to Tx/Rx 630. Processor 610 may be implemented as a general processor or may be part of one or more application specific integrated circuits (ASICs) and/or digital signal processors (DSPs). Memory 620 may include a cache for temporarily storing content, e.g., a random-access memory (RAM). Additionally, memory 620 may include a long-term storage, e.g., a read-only memory (ROM). In one embodiment, memory 620 may include multiple software modules, such as content interest reception module 621, roam detection module 622, route update module 623 and route control module 624.

In some embodiments, content interest reception module 621 may perform all actions performed by the PoA at operation 405. For example, content interest reception module 621 may receive an interest for content available from a producer registered to device 600 from a first peer of device 600.

In some embodiments, roam detection module 622 may perform all actions performed by the PoA at operation 410. For example, roam detection module 622 may receives a message indicating that the producer is registered to a second peer of device 600.

In some embodiments, route update module 623 may perform all actions performed by the PoA at operation 415. For example, route update module 623 may send a mapping between the name prefix of the producer and the identifier of the second peer to the first peer.

In some embodiments, route control module 624 may perform all actions performed by the PoA at operation 420. For example, route control module 624 may notify the second peer to avoid sending the mapping to the first peer, where the mapping is between the name prefix of the producer and the identifier of the second peer. In some embodiments, the interest may be received by a port of device 600. Route control module 624 may further store a mapping between the identifier of the first peer and the port receiving the interest. Consequently, when device 600 needs to send a message to the first peer, device 600 may send the message via the port receiving the interest.

In some embodiments, route update module 623 may sending the name prefix of the producer and the identifier of the second peer to a controller, wherein device 600, the first peer, the second peer and the controller are in a domain.

In some embodiments, device 600 is a PoA, such as PoA 102 in FIG. 1 or PoA 202 in FIG. 2. Memory 602 includes software instructing processor 601 to perform actions that PoA 102 or PoA 202 performs.

It is understood that by programming and/or loading executable instructions onto device 500 or 600, at least one of the processor 510 and/or memory 520 or 620 is changed, transforming device 500 or 600 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

A computer-readable non-transitory media includes all types of computer readable media, including magnetic storage media, optical storage media, and solid state storage media and specifically excludes signals. It should be understood that the software can be installed in and sold with the _ device. Alternatively the software can be obtained and loaded into the _ device, including obtaining the software via a disc medium or from any manner of network or distribution system, including, for example, from a server owned by the software creator or from a server not owned but used by the software creator. The software can be stored on a server for distribution over the Internet, for example.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In addition, techniques, systems, subsystems, and methods described and illustrated in the various embodiments as discrete or separate may be combined or integrated with other systems, modules, techniques, or methods without departing from the scope of the present disclosure. Other mappings shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for controlling data communication in a network, comprising:
    receiving, by a Point of Attachment (PoA) via a port of the PoA, an interest request from a first peer of the PoA, with the interest request being for content available from a producer registered to the PoA, the interest request including a name prefix of the producer and an identifier of the first peer of the PoA;
    receiving, by the PoA, a message indicating that the producer is registered to a second peer of the PoA;
    sending, by the PoA to the first peer, a mapping between the name prefix of the producer and an identifier of the second peer; and
    storing by the PoA, a mapping between the identifier of the first peer and the port receiving the interest request.

2. The method of claim 1, further comprising:
    notifying, by the PoA, the second peer to avoid sending the mapping between the name prefix of the producer and an identifier of the second peer to the first peer.

3. The method of claim 1, further comprising:
    sending, by the PoA, the mapping between the name prefix of the producer and an identifier of the second peer to a controller, wherein the PoA, the first peer, the second peer and the controller are in a same domain.

4. The method of claim 1, with the message indicating that the producer is registered to a second peer being a Border Gateway Protocol (BGP) message.

5. A Point of Attachment (PoA) comprising:
    a non-transitory memory comprising instructions; and
    one or more processors in communications with the memory, wherein the one or more processors are configured to execute the instructions to:
        receive an interest request for content available from a producer registered to the PoA from a first peer of the PoA, with the interest request including a name prefix of the producer and an identifier of the first peer of the PoA;
        receive a message indicating that the producer is registered to a second peer of the PoA; and
        send a mapping between the name prefix of the producer and an identifier of the second peer to the first peer;
        receive the interest request for content via a port of the PoA; and
        store a mapping between the identifier of the first peer and the port receiving the interest request.

6. The PoA of claim 5, with the one or more processors being further configured to execute the instructions to:
    notify the second peer to avoid sending the mapping between the name prefix of the producer and an identifier of the second peer to the first peer.

7. The PoA of claim 5, with the one or more processors being further configured to execute the instructions to:
    send the mapping between the name prefix of the producer and an identifier of the second peer to a controller, wherein the PoA, the first peer, the second peer and the controller are in a same domain.

8. The PoA of claim 5, with the message indicating that the producer is registered to a second peer of the PoA being a Border Gateway Protocol (BGP) message.

* * * * *